United States Patent
Roe

(10) Patent No.: US 10,486,114 B2
(45) Date of Patent: Nov. 26, 2019

(54) SYSTEM AND METHOD FOR GENERATING STABILIZED, GAS INFUSED LIQUIDS CONTAINING HIGH AND ULTRA-HIGH CONCENTRATIONS OF INFUSED GAS, AND METHODS USING THE STABILIZED, GAS INFUSED LIQUIDS

(71) Applicant: Cliffton Lee Roe, Harrison Township, MI (US)

(72) Inventor: Cliffton Lee Roe, Harrison Township, MI (US)

(73) Assignee: Gaps Technology LLC., Slidell, LA (US)

( * ) Notice: Subject to any disclaimer, the term of this patent is extended or adjusted under 35 U.S.C. 154(b) by 218 days.

(21) Appl. No.: 15/653,144

(22) Filed: Jul. 18, 2017

(65) Prior Publication Data

US 2018/0015429 A1    Jan. 18, 2018

Related U.S. Application Data

(60) Provisional application No. 62/363,504, filed on Jul. 18, 2016.

(51) Int. Cl.
*B01F 3/04* (2006.01)
*B01F 5/10* (2006.01)
(Continued)

(52) U.S. Cl.
CPC ........ *B01F 3/0446* (2013.01); *B01F 3/04106* (2013.01); *B01F 3/04439* (2013.01);
(Continued)

(58) Field of Classification Search
CPC .............. B01F 3/04106; B01F 3/04503; B01F 3/0446; B01F 5/10; B01F 3/04439;
(Continued)

(56) References Cited

U.S. PATENT DOCUMENTS

| | | | |
|---|---|---|---|
| 9,527,046 B1 * | 12/2016 | Roe | B01F 3/0446 |
| 2010/0276819 A1 * | 11/2010 | Teng | A61H 33/027 261/31 |
| 2016/0228834 A1 * | 8/2016 | Roe | B01F 3/0446 |

FOREIGN PATENT DOCUMENTS

| | | | | |
|---|---|---|---|---|
| DE | 19955459 A1 * | 5/2001 | | B01F 3/04815 |
| EP | 1219343 A1 * | 7/2002 | | B01F 3/04808 |

* cited by examiner

*Primary Examiner* — Walter D. Griffin
*Assistant Examiner* — Cameron J Allen
(74) *Attorney, Agent, or Firm* — Carrier Blackman & Associates, P.C.; Joseph P. Carrier; William D. Blackman

(57) ABSTRACT

A method for producing stabilized, gas-infused liquids containing ultra high concentrations of infused gas, includes steps of: generating a gas-infused liquid in a sealed vessel under a high pressure of at least 20 psi; stabilizing the gas-infused liquid by passing the liquid while still under the high pressure through a tubular flow path arrangement which compresses the infused gas into nano bubbles in the liquid; infusing an additional amount of the gas into the stabilized liquid by injecting the same, while still under high pressure, back into the sealed pressure vessel along with more of the gas; and again stabilizing the liquid by again passing liquid, while still under the high pressure, through the tubular flow path arrangement to thereby form the additional amount of infused gas into nano bubbles in the liquid.

11 Claims, 6 Drawing Sheets

(51) Int. Cl.
*C02F 1/72*      (2006.01)
*C02F 7/00*      (2006.01)
*C02F 3/12*      (2006.01)
C02F 101/10      (2006.01)
C02F 103/00      (2006.01)
C02F 1/463       (2006.01)

(52) U.S. Cl.
CPC ............ *B01F 3/04503* (2013.01); *B01F 5/10* (2013.01); *C02F 1/727* (2013.01); *C02F 3/1278* (2013.01); *C02F 7/00* (2013.01); *B01F 2003/04319* (2013.01); *B01F 2003/04879* (2013.01); *B01F 2215/0034* (2013.01); *B01F 2215/0052* (2013.01); *B01F 2215/0468* (2013.01); *C02F 1/463* (2013.01); *C02F 2101/101* (2013.01); *C02F 2101/103* (2013.01); *C02F 2103/007* (2013.01); *C02F 2209/22* (2013.01); *C02F 2305/023* (2013.01)

(58) Field of Classification Search
CPC .. B01F 2003/04879; B01F 2003/04319; B01F 2215/0468; B01F 2215/0052; B01F 2215/0034; C02F 3/1278; C02F 1/727; C02F 7/00; C02F 2101/103; C02F 2101/101; C02F 2103/007; C02F 1/463; C02F 2209/22; C02F 2305/023
See application file for complete search history.

SYSTEM AND METHOD FOR GENERATING STABILIZED, GAS INFUSED LIQUIDS CONTAINING HIGH AND ULTRA-HIGH CONCENTRATIONS OF INFUSED GAS, AND METHODS USING THE STABILIZED, GAS INFUSED LIQUIDS

CROSS-REFERENCE TO RELATED APPLICATIONS

The present application claims the benefit of priority to U.S. Provisional Patent Application No. 62/363,504, filed Jul. 18, 2016. The entire subject matter of these priority documents, including specification claims and drawings thereof, is incorporated by reference herein.

BACKGROUND OF THE INVENTION

1. Field of the Invention

The present disclosure relates to a novel system and method for generating stabilized, gas-infused liquids containing high and ultra-high concentrations of infused gas, and methods of using the stabilized, gas-infused liquids for various useful purposes. More particularly, the present disclosure relates to such a novel system and methods which can safely, quickly, and very efficiently generate such stabilized, gas-infused liquids containing unprecedented percentages of infused gas, and methods of using such stabilized, gas-infused liquids in a wide variety of useful applications.

2. Background

Systems and methods are known for generating stabilized, gas-infused liquids containing comparatively high concentrations or percentages of infused gas. For example, the present inventor has previously proposed such systems and methods as set forth in in International Application PCT/US2014/064727, filed 10 Nov. 2014, which claims priority from U.S. Provisional Application 61/904,755, U.S. Pat. No. 9,596,186 which issued on the US National Phase application of PCT/US2014/064727, U.S. Utility application Ser. No. 14/991,534, filed 8 Jan. 2016, now U.S. Pat. No. 9,527,046, and U.S. Utility application Ser. No. 15/591,422, filed 10 May 2017. The entire disclosures of these prior applications are incorporated herein by reference.

The present inventor's previous disclosures are primarily focused on novel devices and processes which are used to generate stabilized, gas-infused liquids. However, the previous disclosures also generally discuss that the stabilized, gas-infused liquids which are generated may be advantageously used in numerous different manners for achieving a wide variety of desirable effects, and also generally mention some specific useful applications for the stabilized, gas-infused liquids. The present inventor has also previously disclosed, in U.S. Utility patent application Ser. No. 15/412,684, filed 23 Jan. 2017, which claims priority from U.S. Provisional Application 62/286,095, filed 22 Jan. 2016, a novel system and method for treating liquids and solutions to remove and/or separate components thereof using stabilized, gas-infused liquids such as formed using the systems and methods discussed above. The entire disclosure of U.S. Utility patent application Ser. No. 15/412,684 and U.S. Provisional Application 62/286,095 are also incorporated herein by reference.

Although the present inventor's previous disclosures discussed above provide significant advantages over the other previously known systems and methods for generating and using stabilized, gas-infused liquids, desiderata still exist for further increasing the amount of gasses that may be stably infused into liquids, as well as specific applications in which the stabilized, gas-infused liquids may be usefully applied in a wide variety of applications.

SUMMARY OF THE INVENTION

According to a first aspect of the present invention there is provided a method for producing stabilized, gas-infused liquids containing ultra high concentrations of infused gas, comprising the steps of:

a) generating a gas-infused liquid by injecting a pressurized liquid and a gas into a sealed vessel under a high pressure of at least 20 psi;

b) stabilizing the infused gas in the liquid by discharging the gas-infused liquid from the sealed vessel, while still under the high pressure, into a tubular flow path arrangement which is configured to effect a multi-dense compaction of elements of the gas-infused liquid, and thereby form the infused gas into nanobubbles in the gas-infused liquid;

c) infusing an additional amount of the gas into the stabilized, gas-infused liquid by injecting the stabilized, gas-infused liquid, while still under high pressure, back into the sealed pressure vessel along with more of the gas; and d) stabilizing the additional amount of gas into the stabilized, gas-infused liquid by again discharging the gas-infused liquid from the sealed vessel, while still under the high pressure, into the tubular flow path arrangement to thereby form the additional amount of infused gas into nanobubbles in the stabilized, gas-infused liquid. As used in the present application "high pressure" means a pressure of at least 20 psi and up to 1000 psi or more.

According to a second aspect of the present invention, along with the first aspect of the invention, the steps c) and d) are repeated at least one additional time to infuse and stabilized additional amount(s) of the gas into the stabilized, gas-infused liquid.

Although the exact mechanism underlying the process may not be fully understood, based on testing of actual samples oxygen-infused water, it is the present inventor's belief that the stabilized, oxygen-infused water containing ultra-high concentrations of oxygen according to the first aspect of the invention contains multiple molecules of oxygen in the form of nanobubbles for every molecule of water or hydrogen in the gas-infused liquid, and that for each time gas is infused into the liquid and then stabilized initially in the steps a)-b), and subsequently in the steps c)-d), one nano bubble of oxygen $(O_2)$ is attached/bonded to the hydrogen or $OH^-$ in each water molecule, so that the final stabilized water solution may be identified as $H2O.(O_2)_n$, where n is the number of times that the water has been infused with oxygen $(O_2)$ and then stabilized. According to the present inventor's belief, when the $(O_2)$ is initially infused into the water under high pressure the size of the $(O_2)$ bubble limits the ability of more than one $(O_2)$ bubble to be attached to a water molecule, but after the size of the $(O_2)$ bubble is greatly reduced to nano size via the stabilization process, it then becomes possible to attach an additional $(O_2)$ bubble to the $H2O.(O_2)_n$ molecule by repeating the gas-infusing and stabilization steps.

It is currently unclear to the present inventor just how many $(O_2)$ nano bubbles may be attached to a single water molecule, but through experimentation the greatest number of $(O_2)$ nano bubbles that he believes that he has been able to attach to a single water molecule is nine (9), presumably resulting in a molecule which may be represented as $H2O.(O_2)_9$. It is very possible that the number n may be much larger than nine, with use of the proper equipment. The present inventor has infused ultra-high concentrations of oxygen into water according to the first and second aspects of the present invention, e.g., resulting in a clear, stable fluid that appears very similar to regular clean water having little or no gas infused therein, but which weighs less that ⅕ of the water having no gas infused therein for the same volume.

The methods according to the first and second aspects of the present invention are very advantageous because they can efficiently infuse and stabilize ultra high concentrations of gas(ses) in liquid(s), which stabilized, gas-infused liquids may then be used in a wide variety of applications for efficiently achieving various desirable results based on the ultra high concentrations of the gas(ses) in the stabilized, gas-infused liquids. For example, such gas infused liquid may be efficiently used in relatively small quantities in various processes in comparison to other gas-infused liquids containing lesser amounts of the infused gas because the amount of gas/unit of the liquid is significantly higher.

Further, some applications may require a very large quantity of stably infused gas in order to function appropriately, e.g., for treating heart attack victims it has previously been proposed to inject the victims with a saline aqueous solution containing infused oxygen so that the oxygen may be quickly delivered to the heart to reverse any heart damage caused by the heart attack. Up until now this has not proven successful because it has not been possible to stably infuse a sufficiently large quantity of the infused gas into the saline solution in a manner that assures the gas will not be released as gas bubbles within the victim's bloodstream. With the present invention, however, a stable, oxygen-infused saline solution containing an ultra-high quantity of oxygen prepared according to the first and second aspects of the present invention may be appropriate for injecting into heart attack victims because the oxygen very stably remains in the saline solution such that it should not be released within the victim's bloodstream even at the ultra-high concentrations.

According to a third aspect of the present invention the stabilized, gas-infused liquids containing high or ultra high concentrations of infused gas(ses) are used for efficiently promoting various chemical reactions through greatly increased redox potential. For example, the present inventor has found that stabilized water-based solutions containing high or ultra high concentrations of oxygen infused therein may be used to efficiently promote oxidations reactions in continuous or batch type processes in which a liquid such as contaminated waste water is flowed into a reactor and stably infused with high or ultra high concentrations of oxygen for removing undesirable and toxic matters from the water-based solutions. The stably infused oxygen gas increases the redox potential of the liquid to an alkaline state through pH adjustment, and this, possibly together with the addition of other chemical elements or compounds that promote certain reactions with components of the contaminated waste water, can efficiently cause the undesired contaminants to react and be formed into different states or compounds, which may be readily and safely removed.

Two specific examples are: removal of arsenic (As) from waste water through redox transformation into arsenate, which may then be safely removed; and removal of hydrogen sulfide ($H_2S$) from waste water through redox transformation into metal sulfate(s) which can be readily precipitated from the aqueous solution. Hydrogen sulfide is a gaseous compound which is highly toxic to humans, is slightly soluble in water and acts as a weak acid, giving the hydrosulfide ion $HS^-$.

According to a fourth aspect of the present invention, along with the third aspect of the invention, the gas stably infused in the liquid may be a very reactive gas which normally is not stable at all. For example, nascent oxygen, a single oxygen atom radical, is a known highly reactive oxidant and is typically formed in situ because it is so reactive and does not stay in nascent form for any appreciable length of time. According to the fourth aspect of the present invention, there is provided a process for forming a stabilized liquid solution containing nascent oxygen therein, comprising the steps of: treating a stream of oxygen ($O_2$) gas with an appropriate light source that excites and splits the oxygen ($O_2$) molecules into nascent oxygen; infusing the nascent oxygen into a liquid such as water within a high pressure treatment cell to form a liquid having a suitable concentration of infused oxygen, e.g., as 5-700 ppm; then stabilizing the pressurized gas-infused liquid by passing it through a flowpath which compresses the nascent oxygen into stable nano bubbles. An appropriate light source for exciting and splitting the oxygen ($O_2$) molecules into nascent oxygen is an ultra violet (UV) white light source, e.g., one which outputs light beams with a wave length of 331 nm (nanometers).

Given that the nascent oxygen gas is so reactive, it is important to form the various components of the system that are contacted by the nascent oxygen with at least a surface coating of material that will not react with or will resist reacting with the nascent oxygen. Some suitable materials include silica based glass ($SiO_2$), stainless steel, various ceramics, and Polytetrafluoroethylene (PTFE). Also, it is important that the oxygen ($O_2$) gas is split into the nascent oxygen prior to being infused into the liquid such as water because it is very difficult or impossible to split the oxygen ($O_2$) gas into the nascent oxygen after it is infused into the water/liquid in that the water/liquid tends to absorb the energy of the light source.

Again, suitable flowpaths that may be used to stabilize the oxygen-infused liquid may be any of those disclosed U.S. Pat. Nos. 9,596,186, 9,527,046, and U.S. Utility application Ser. No. 15/591,422. Once the stabilized liquid containing the infused nascent oxygen is formed, it may then be used for various useful purposes, including chemical oxidation reactions because the nascent oxygen is a highly reactive oxidant, e.g., at least 100 times greater than the normal $O_2$ molecule in reactions in reactions of chemical elements that are chemically oxidizable. The ORP (oxygen reduction potential) of the stabilized, nascent oxygen infused water produced according to the present invention will far exceed the scale for normal oxygen by approximately 1100. It is the present inventor's belief and understanding that no one has previously been able to create a stable solution containing an appreciable amount of nascent oxygen therein.

According to a fifth aspect of the present invention the stabilized, gas-infused water containing high or ultra high concentrations of infused oxygen is used as a means for augmenting oxygen into an open body of water such as a pond, lake, or river, to revitalize same. Ponds, lakes, rivers, and other open bodies of water may become so-called dead zones because oxygen uptake from the water exceeds the replenishment of oxygen therein, thus leaving the water in an oxygen deficient state. In extreme oxygen deficient states, the open body of water may even come into a septic condition, which is very harmful for most living matter, but which promotes growth of some species of algae, bacteria, parasites, etc., as well as decomposition of organic matter into ammonia ($NH_3$) and/or other odorous or toxic materials, which is extremely bad for and may destroy a healthy eco system. To counteract the oxygen deficient state of an open body of water, appropriate amount(s) of water stably infused with a high or ultra-high amount(s) of oxygen may be flowed into the open body of water over a period of time until the open body of water contains an average diluted amount of the stabilized, infused oxygen in a range of approximately 2-5 mg/l. Such diluted amount of the stabilized, infused oxygen is an appropriate level for revitalizing living matter in the open body of water, but is not so high as to form a plume that would chemically oxidize and create a fish kill or other undesirable state in the body of water, e.g., oxygen levels above 7 mg/l are considered harmful to fish. Once an appropriate level of the stabilized, infused oxygen is achieved in the open body of water, further addition of the stabilized, oxygen-infused water may be discontinued until the open body of water again drops to a deficient oxygen level, and at which time further appropriate amount(s) of water stably infused with a high or ultra-high amount(s) of oxygen may be flowed into the open body of water over a period of time until the open body of water again contains an average diluted amount of the stabilized, infused oxygen in a range of approximately 2-5 mg/l. This process may be repeated several times, but at some point the open body of water should return to a revitalized state which is self-sustaining for at least some extended period of time.

According to a sixth aspect of the present invention the stabilized, gas-infused water containing high or ultra high concentrations of infused oxygen is used as a means for treating and eliminating toxic algae blooms, which sometimes form on open bodies of water, and can cause serious health issues for humans and other animals. For example, the State of Florida has experienced some very serious problems with toxic algae blooms on Lake Okeechobee and other bodies of water, to the extent that they would like it to be deemed a national emergency.

According to a sixth aspect of the present invention the stabilized, gas-infused water containing high or ultra high concentrations of infused oxygen is used as a means for bio-remediation of biodegradable matters in a bio-reaction process. Bio-remediation of organic matters can, for example, be performed in an aerobic bio-reactor or treatment cell having a nutrient load or pounds of biochemical/biological oxygen demand (BOD). In a bio-reaction process according to the sixth aspect of the present invention, an aqueous-based liquid containing the organic matters to be bio-remediated, e.g., waste water at a municipal waste water treatment plant, may be directly or indirectly infused with a gas (typically oxygen) which is essential or helpful to support microbial life forms and maximize an aerobic plate count (APC) until an optimal amount of the infused gas in the liquid is achieved using, for example, the systems and methods previously proposed by the present inventor as discussed above. The optimal amount of the gas to be infused will typically depend on the gas and the microbial species involved in the bio-remediation. For example, if oxygen the gas and organic matters include human waste, the optimal amount of infused oxygen is typically in a range of 2-7 mg/l.

If the process involves direct infusion of oxygen into the waste water, a small portion of the waster water may be directly infused with a high or ultra-high concentration of oxygen and then combined with a much larger portion of the waste water in the bio-reactor, e.g., an injection nozzle fixed to the bio-reactor injects the oxygen-infused water into the reactor containing the larger portion of the waste water until the average content of infused oxygen in the combined liquids is within the optimal range for the microbial species involved. Similarly, if the process involves indirect infusion of oxygen into the waste water, clean water may stably infused with oxygen at high or ultra-high levels according to the present inventor's previously disclosed systems and methods, and then the oxygen-infused water is combined with the waste water in the bio-reactor until the average content of infused oxygen in the combined liquids is within the optimal range for the microbial species involved.

Once the aerobic digestion process is active within the bio-reactor, the optimal concentration of infused oxygen may be maintained at a controlled ppm or mg/l by monitoring the oxygen level using a dissolved oxygen meter or other appropriate sensor, with parameters set based on the species of treatment. When the infused oxygen reaches a maximum concentration limit of the optimal range injection of the oxygen-infused water into the bio-reactor is discontinued, allowing the microbial oxygen uptake to consume the oxygen in the bio-remediation of organic matters until the oxygen content drops to a lower limit within the optimal range, at which point injection of the gas-infused water may again be restarted and continued until the oxygen concentration of the combined liquids in the bio-reactor is increased back to the upper limit, and the cycle is repeated as necessary so the aerobic digestion process is maintained at an optimal dissolved oxygen content at all times.

Such treatment process according to the sixth aspect of the invention can very rapidly biodegrade organic nutrients in waste water. Typical BOD to oxygen ratio is 1-1.5 pounds of oxygen will consume 1 pound of BOD. To calculate pounds of BOD in waste water the formula is: (Vol−MGD)×(Conc−Mg/L)×8.34=Loading pounds. With this formula it is possible to pre-calculate pounds of oxygen needed to treat a volume of waste water at a specific Concentration of BOD. Additionally, with a respirometer or measurement of oxygen uptake an operator can determine any other elements, such as carbon, that are missing or at a deficient level, and if so may be added to further accelerate the bio-degradation process.

According to a seventh aspect of the present invention the stabilized, gas-infused water containing infused oxygen may be used as a means for safely and efficiently treating contaminated sediment at the bottom of a body of water in situ without having to stir up or remove the sediment. Particularly, the present inventor has determined that stabilized, oxygen-infused water containing low to moderate amounts of infused oxygen will sink to the bottom of an open body of water if the oxygen-infused water is chilled to an appropriate temperature, e.g., a temperature below the surface temperature of the body of water, prior to being added to the body of water. Also, if the body of water is reasonably deep, temperature of the water at the bottom it will be at a mucha lower temperature than that of the water at the surface, which will further assist in maintaining the stable, oxygen-infused water at the bottom of the body of water. Thus, for example, if the sediment at the bottom of a body of water is known to contain a significant quantity of a given contaminant such as phosphorous, a process for remediating the sediment in situ according to an embodiment of the present invention may involve the steps of: generating a solution of oxygen-infused water containing an appropriate quantity of oxygen, e.g., 2-7 mg/l at high pressure in a hyperbaric chamber; stabilizing the pressurized oxygen-infused water by passing it through a flowpath which compresses the oxygen into nano bubbles or the like; cooling the stabilized, oxygen-infused water; and flowing the cooled, stabilized, oxygen-infused water into a body of water below the surface of the body of water such that the cooled, stabilized, oxygen-infused water sinks to the bottom of the body of water and remains there permitting the infused oxygen to react with contaminants in sediment at the bottom of the body of water.

Again, a suitable flowpath for stabilizing the oxygen-infused water may be any of those disclosed U.S. Pat. Nos. 9,596,186, 9,527,046, and U.S. Utility application Ser. No. 15/591,422. As discussed in these prior disclosures, the oxygen as stably infused in the water may remain infused therein for one or two months, or longer. Further, by adding the oxygen-infused water at specific locations of the body of water, the stabilized water containing the oxygen will accumulate at the bottom of the body of water beneath these specific locations and generally remain at these locations until the oxygen is depleted. Hence, the infused oxygen has a relatively long time to react with the contaminants in the sediment.

According to an eighth aspect of the present invention the stabilized, gas-infused water containing high or ultra high concentrations of infused oxygen is used as a means for efficiently separating components of liquid mixture or chemically engineered product. In a separation process according to the eighth aspect of the present invention, water or an aqueous based liquid may be stably infused with high or ultra-high amounts of an appropriate gas or gasses such as oxygen, carbon dioxide, etc. using, for example, any of those disclosed U.S. Pat. Nos. 9,596,186, 9,527,046, and U.S. Utility application Ser. No. 15/591,422. The gas-infused may then be injected into a treatment cell along with the liquid mixture or chemically engineered product in a continuous process conducted in a treatment cell, e.g., the liquid mixture or chemically engineered product is injected into the treatment cell so that it is floated across the top of a layer of the stable gas-infused water or aqueous based liquid according to a system and process such as disclosed in U.S. Utility patent application Ser. No. 15/412,684, which allows micro bubbles of the infused gas to be released from the water or aqueous based liquid and permeate upwardly through the liquid mixture or chemically engineered product being treated causing components of the liquid mixture or chemically engineered product to be efficiently separated. This process displaces the density of the liquid mixture or chemically engineered product thus allowing separation of the components of same by molecular weight.

According to a specific process disclosed in U.S. Utility patent application Ser. No. 15/412,684 crude oil contaminated with rag oil, suspended solids, and perhaps other undesirable components is a liquid mixture which is efficiently separated into components according to the eighth aspect of the present invention, e.g., it is separated into sweet crude oil, rag oil, total suspended solids (TSS), and undesired gaseous components, which may be conveniently, separately discharged from the treatment cell.

An example of a chemically engineered product that may be separated in a process according to the eighth aspect of the present invention is a waste or off-spec polymeric emulsion such as a urethane emulsion. Again, a layer of this chemically engineered product may be floated across the top of a layer of the stable gas-infused water or aqueous based liquid according to a process such as disclosed in U.S. Utility patent application Ser. No. 15/412,684, which allows micro bubbles of the infused gas to be released from the water or aqueous based liquid and permeate upwardly through the chemically engineered product causing components of the liquid mixture or chemically engineered product to be efficiently separated, such that they may be reused or safely disposed of as non-reactive, non-hazardous waste.

According to a ninth aspect of the present invention the stabilized, a gas-infused liquid containing high or ultra high concentrations of infused gas may be used in combination with other known treatment systems and processes for enhancing the same. For example, electro-coagulation is a known process for treating aqueous based solutions for removing contaminants therefrom, and electro-coagulation can be greatly enhanced when used in combination with water or aqueous based solutions that have been stably infused with high or ultra-high concentrations of oxygen according to the present invention. For example, waste water may be initially, stably infused with an appropriate amount of oxygen, and then subjected to electro-coagulation for removing various impurities from the waste water. Electro-coagulation increases the conductivity and ionization potential of the waste water by 4 fold at a given pH. Typically lower pH would have greater conductivity than that of higher pH, but the stable infusion of oxygen into the waster water prior to the electro-coagulation increases the ionization potential four fold to the comparative normal conductance, whereby the electro-coagulation can more efficiently remove the impurities faster and to a greater extent.

As another example, carbon dioxide ($CO_2$) and other gasses may be stably infused into a liquid containing contaminants that are reactive to anionic or cationic polymers. The stably infused $CO_2$, or other gasses, cause greater reaction in the electrocoagulation process in liberating contaminates that are reactive to anionic or cationic polymers. Typically the voltage remains the same or is lower and the current load increases in highly conductive solutions during the electrocoagulation process making the contaminates highly reactive to a polymerized flock of the anionic or cationic polymers, e.g., the contaminates bond to the polymerized flock of the anionic or cationic polymers, drop out of solution and may then be easily removed.

For a more complete understanding of the present invention, the reader is referred to the following detailed description section, which provides details of present exemplary embodiments of the invention.

INTENT OF DISCLOSURE

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

DETAILED DESCRIPTION OF PRESENT EXEMPLARY EMBODIMENTS

Figures 1A, 1B:
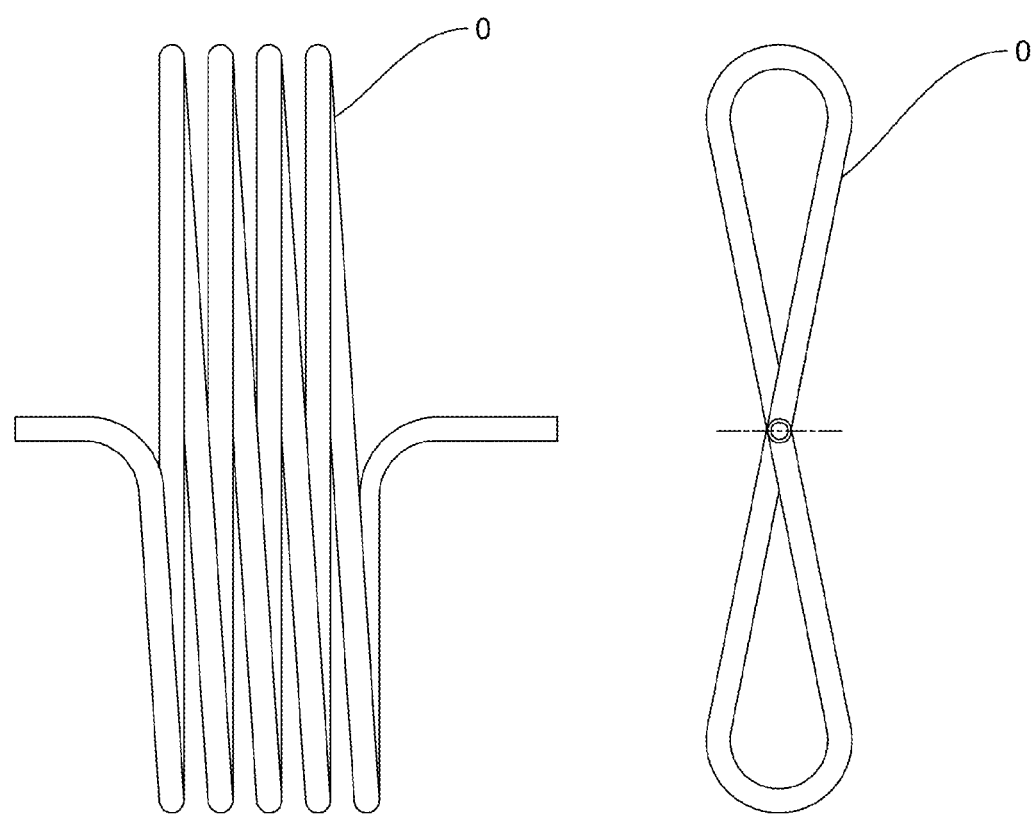
FIGS. 1A, 1B are side and end views of an exemplary embodiment of a stabilizing flowpath previously proposed by the present inventor in PCT/US2014/064727.
Figure 2A:
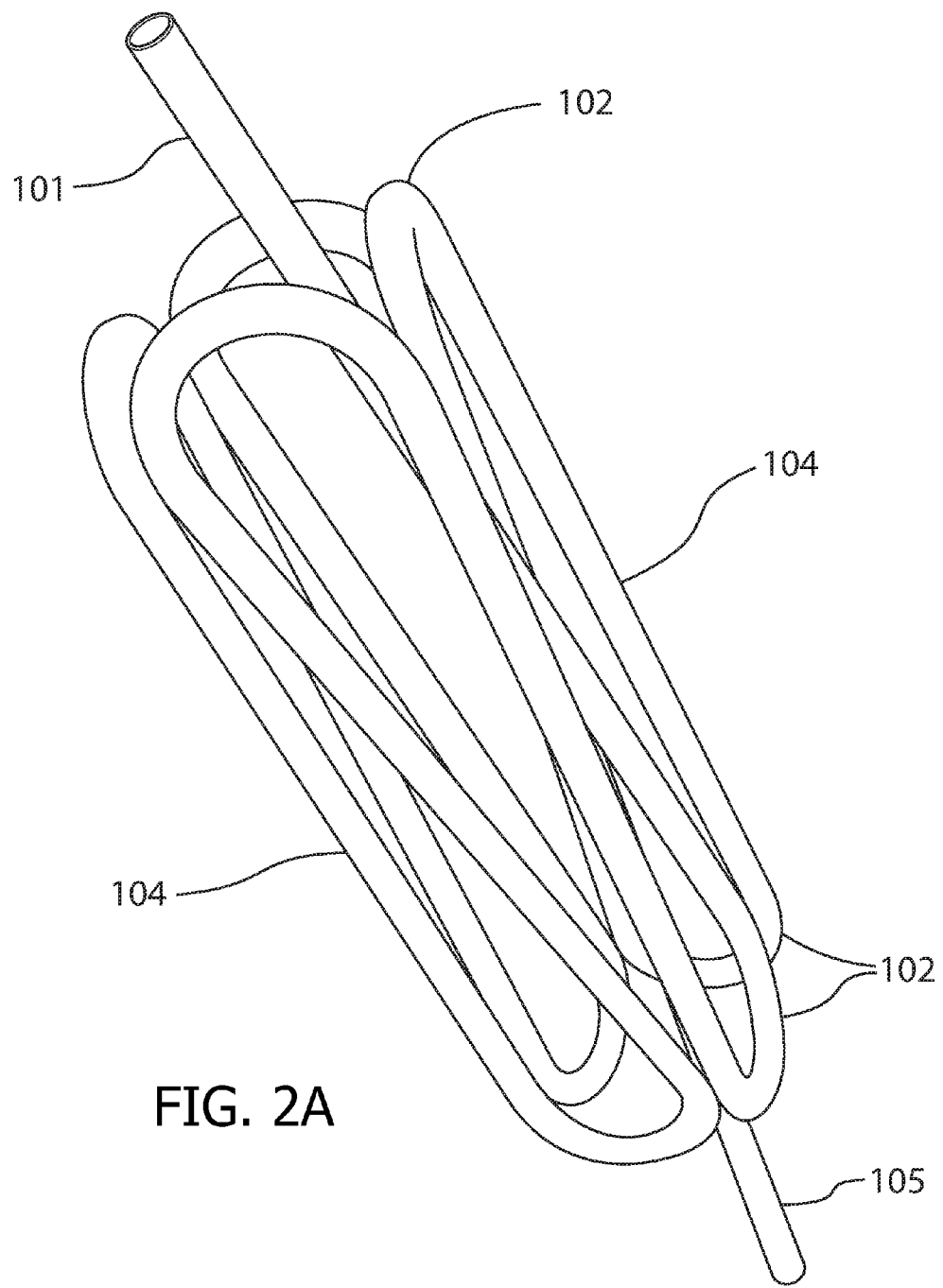
FIGS. 2A-2D are perspective, side, end, and cross-sectional views of another exemplary embodiment of a stabilizing flowpath previously proposed by the present inventor in U.S. Pat. No. 9,527,046.
Figure 2B:
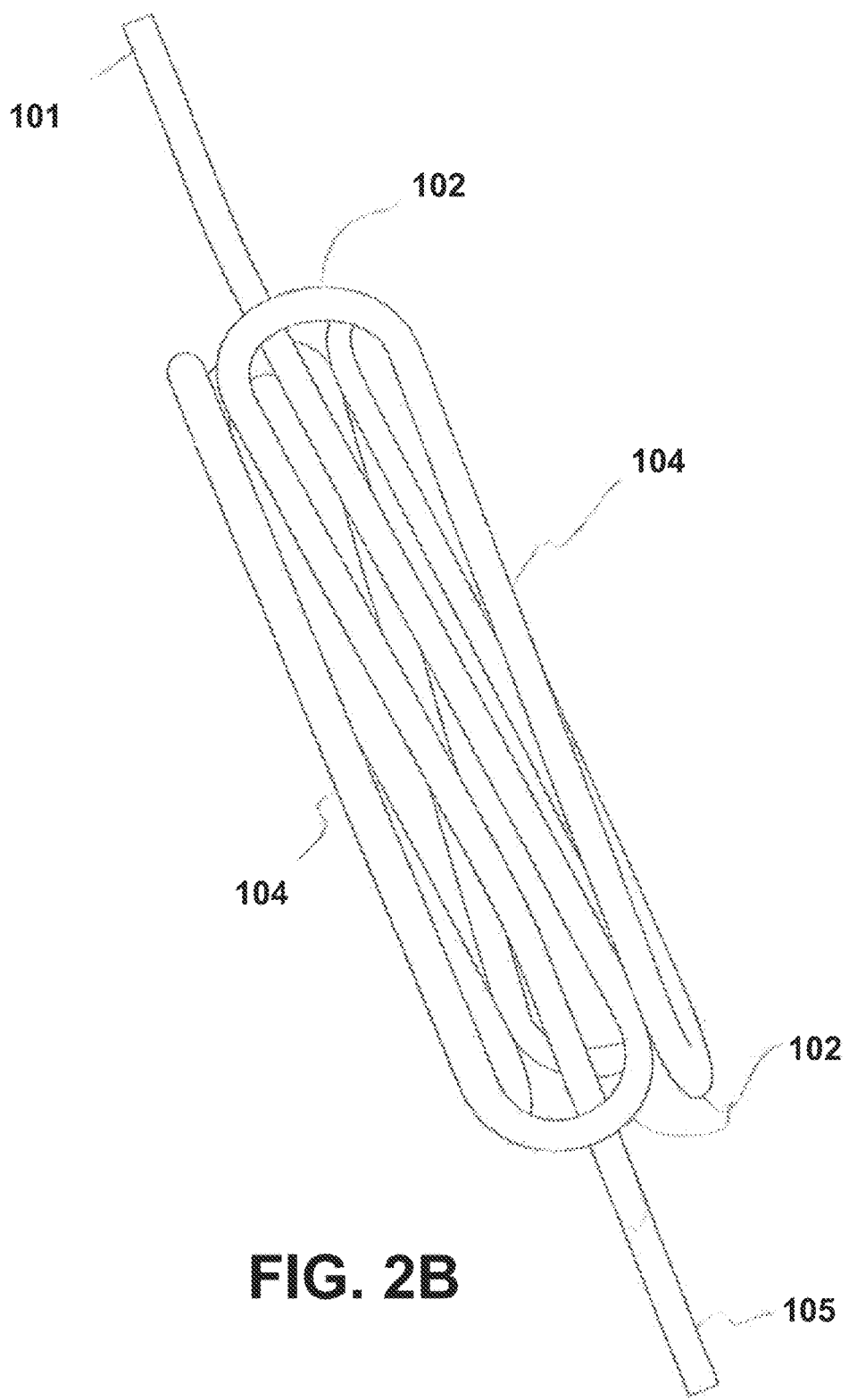
Figure 2C:
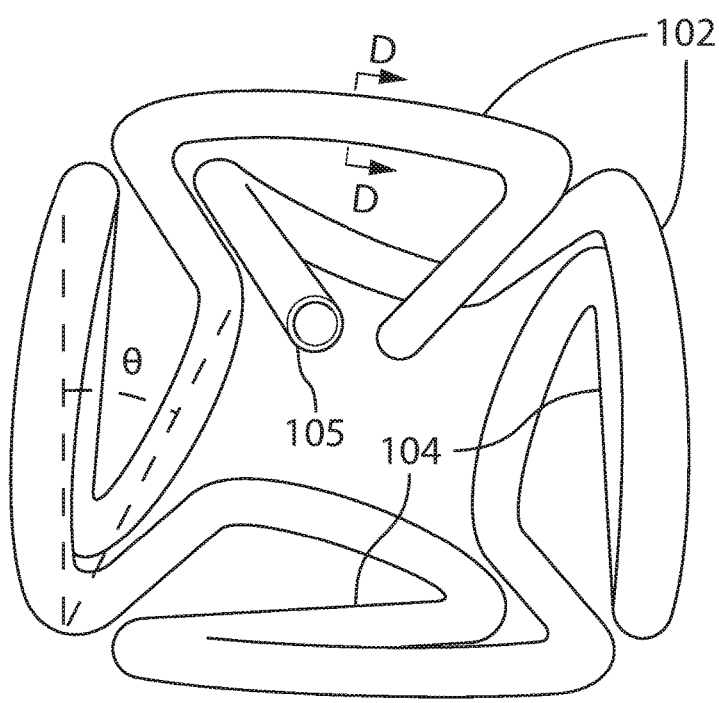
Figure 2D:
Figure 3:
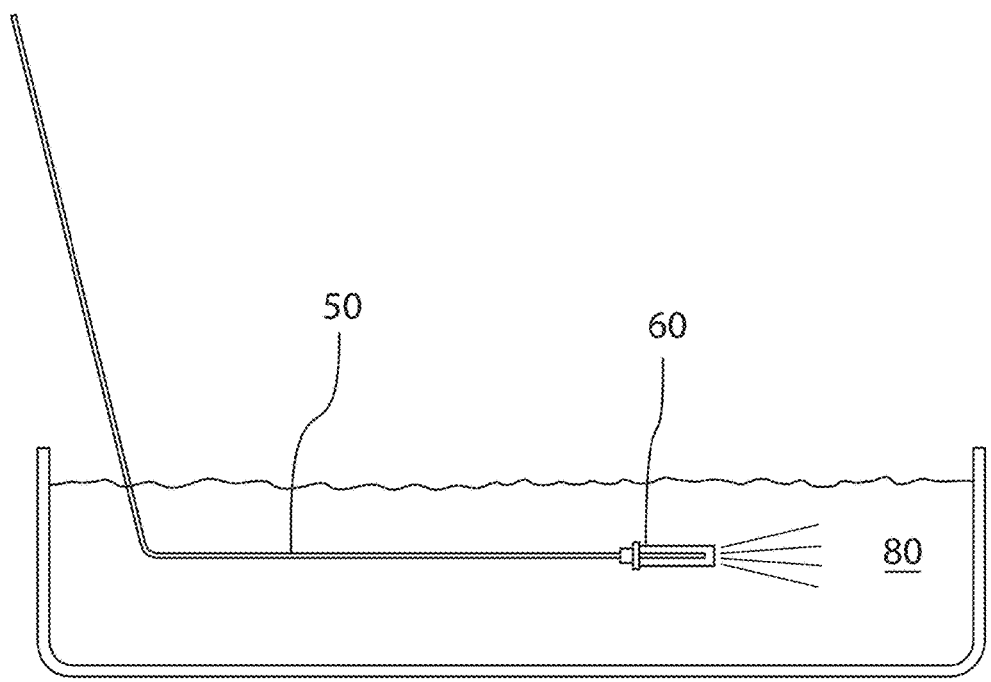
FIG. 3 is a side view of another exemplary embodiment of a stabilizing flowpath and discharge nozzle previously proposed by the present inventor in U.S. Utility application Ser. No. 15/591,422.
Figure 4:
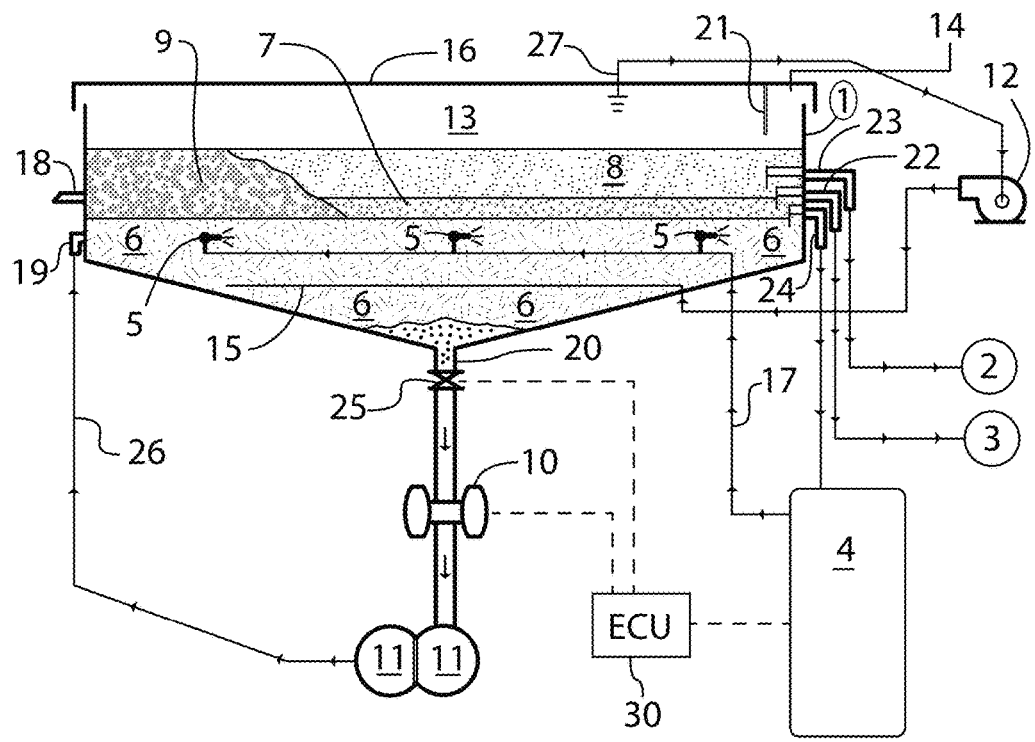
FIG. 4 is a schematic view of a system for treating hydrocarbon based liquids and solutions such as crude oil for separating components thereof using a stabilized, gas-infused aqueous liquid in a continuous manner of operation previously proposed by the present inventor in U.S. Utility patent application Ser. No. 15/412,684.

The tubular flowpaths shown in FIGS. 1A-1B, 2A-2D and 3 are exemplary embodiments of stabilizing flowpaths that may be used for stabilizing gas-infused liquids in the several exemplary embodiments of the present invention as disclosed herein. The details of these stabilizing flowpaths are not discussed herein, but are explained in PCT/US2014/064727, U.S. Pat. No. 9,596,186, U.S. Pat. No. 9,527,046, and U.S. Utility application Ser. No. 15/591,422, the disclosures of the previous applications and patents which are incorporated herein by reference. FIGS. 1A, 1B 1B are side and end views of an exemplary embodiment of a stabilizing flowpath 0 previously proposed by the present inventor in PCT/US2014/064727. FIGS. 2A-2D are perspective, side, end, and cross-sectional views of another exemplary embodiment of a stabilizing flowpath including components 101-106 previously proposed by the present inventor in U.S. Pat. No. 9,527,046. FIG. 3 is a side view of another exemplary embodiment of a stabilizing flowpath and discharge nozzle including components 50, 60 previously proposed by the present inventor in U.S. Utility application Ser. No. 15/591,422. FIG. 4 is a schematic view of a system including components 1-27 and 30 for treating hydrocarbon based liquids and solutions such as crude oil for separating components thereof using a stabilized, gas-infused aqueous liquid in a continuous manner of operation previously proposed by the present inventor in U.S. Utility patent application Ser. No. 15/412,684. The treatment system shown in FIG. 4 is an exemplary embodiment of a system that may be used in some of the exemplary embodiments of the present invention for separating components of a liquid mixture or solution. The details of these treatment system are not discussed herein, but are explained in U.S. Utility patent application Ser. No. 15/412,684, the disclosures of which is incorporated herein by reference.

According to a first exemplary embodiment of the present invention, stabilized, gas-infused liquid containing ultra-high content of the infused gas(ses) are generated by repeating the steps of infusing a quantity of the gas(ses) into the liquid, and then stabilizing the liquid until a desired, ultra-high content of the infused gasses is achieved. The gas-infusing and stabilizing steps may be steps such as disclosed in the prior applications and US patents discussed above, e.g., the gas-infusing step involves injecting the liquid, such as water, and the gas, such as oxygen or carbon dioxide into a hyperbaric chamber under high pressure such as 20-1000 psi, and the stabilization step involves discharging the gas-infused liquid, while still under high pressure, so that it flows through a special tubular flowpath which causes gas bubbles in the gas-infused liquid to be compressed into stable nano bubbles or the like within the liquid. Generally, it is understood for example that once a gas bubble in water is reduced to a size of 20 nm or so, it collapses and becomes very stable. Once the gas-infused liquid is stabilized, it may then be re-injected into the hyperbaric chamber together with more of the gas(ses) under high pressure, to thereby infuse the liquid with more of the gas(ses), and again discharging the gas-infused liquid from the hyperbaric chamber, while still under the high pressure, so that it again flows through the tubular flow path arrangement to thereby form the additional amount of infused gas into stable nano bubbles or the like in the stabilized, gas-infused liquid. The gas infusing and stabilizing steps may then be repeated multiple times until the desired amount of gas(ses) has been stably infused into the liquid.

Although it is generally undesirable to avoid creating shear when discharging a gas-infused liquid because this tends to cause the gas to become unstable and discharged from the liquid as explained in U.S. Utility application Ser. No. 14/991,534, this primarily applies when discharging the gas-infused liquid under standard temperature and pressure conditions. In the discussed embodiment of the present invention, the stabilized, gas-infused liquid may be atomized when being injected or re-injected into hyperbaric chamber without causing the gas to become unstable and discharged from the liquid because the injection/reinjection is done under high pressure such as 50-1000 psi.

Although the exact mechanism underlying the process may not be fully understood, based on testing of actual samples oxygen-infused water, it is the present inventor's belief that the stabilized, oxygen-infused water containing ultra-high concentrations of oxygen according to the first aspect of the invention contains multiple molecules of oxygen in the form of nanobubbles for every molecule of water or hydrogen in the gas-infused liquid, and that for each time gas is infused into the liquid and then stabilized initially in the steps a)-b), and subsequently in the steps c)-d), one nano bubble of oxygen ($O_2$) is attached/bonded to the hydrogen or $OH^-$ in each water molecule, so that the final stabilized water solution may be identified as $H2O.(O_2)_n$, where n is the number of times that the water has been infused with oxygen ($O_2$) and then stabilized. According to the present inventor's belief, when the ($O_2$) is initially infused into the water under high pressure the size of the ($O_2$) bubble limits the ability of more than one ($O_2$) bubble to be attached to a water molecule, but after the size of the ($O_2$) bubble is greatly reduced to nano size via the stabilization process, it then becomes possible to attach an additional ($O_2$) bubble to the $H2O.(O_2)_n$ molecule by repeating the gas-infusing and stabilization steps.

It is currently unclear to the present inventor just how many ($O_2$) nano bubbles may be attached to a single water molecule through the process of the present invention, but through experimentation the greatest number of ($O_2$) nano bubbles that he believes that he has been able to attach to a single water molecule is nine (9), presumably resulting in a molecule which may be represented as $H2O.(O_2)_9$, with 50-700 mg of oxygen/1 of water being infused in each of the gas-infusing steps, and that little additional oxygen may be stably infused into the water even if the infusion and stabilization steps are repeated more than nine or ten times. It is possible that the number n may be much larger than nine, with use of the proper equipment. The present inventor has infused ultra-high concentrations of oxygen into water according to the first and second aspects of the present invention, e.g., resulting in a clear, stable fluid that appears very similar to regular clean water having little or no gas infused therein, but which weighs less that ⅕ of the water having no gas infused therein for the same volume.

The stabilized, gas-infused liquids generated according to the exemplary embodiment of the present invention are very advantageous because contain ultra high concentrations of the gas(ses) in the liquid(s), which stabilized, gas-infused liquids may then be used in a wide variety of applications for efficiently achieving various desirable results based on the ultra high concentrations of the gas(ses) in the stabilized, gas-infused liquids. For example, such gas infused liquid may be efficiently used in relatively small quantities in various processes in comparison to other gas-infused liquids containing lesser amounts of the infused gas because amount of gas/unit of the liquid is significantly higher. Further, some applications may require a very large quantity of stably infused gas in order to function appropriately, e.g., for treating heart attack victims it has previously been proposed to inject the victims with a saline aqueous solution containing infused oxygen to reverse any heart damage caused by the heart attack, but this has not proven successful because it has not been possible to stably infused a sufficiently large quantity of the infused gas into the saline solution such that the gas is not released as gas bubbles within the victim's bloodstream. A stable, oxygen-infused saline solution containing an ultra-high quantity of oxygen prepared according to the first and second aspects of the present invention may be appropriate for injecting into heart attack victims because the oxygen is not released within the victim's bloodstream even at the ultra-high concentrations.

According to a second exemplary embodiment of the present invention the stabilized, gas-infused liquids containing high or ultra high concentrations of infused gas(ses) are used for efficiently promoting various chemical reactions through greatly increased redox potential.

For example, the present inventor has found that stabilized water-based solutions containing high or ultra high concentrations of oxygen infused therein may be used to efficiently promote oxidations reactions in continuous or batch type processes in which a liquid such as contaminated waste water is flowed into a reactor and stably infused with high or ultra high concentrations of oxygen for removing undesirable and toxic matters from the water-based solutions. The stably infused oxygen gas increases the redox potential of the liquid to an alkaline state through pH adjustment, and this, possibly together with the addition of other chemical elements or compounds that promote certain reactions, can efficiently cause the undesired contaminants to react and be formed into different states or compounds, which may be readily and safely removed. Some specific examples are: removal of arsenic (As) from waste water through redox transformation into arsenate, which may then be safely removed; and removal of hydrogen sulfide ($H_2S$) from waste water through redox transformation into metal sulfate(s) which can be readily precipitated from the aqueous solution, noting that hydrogen sulfide is a gaseous compound which is highly toxic to humans, is slightly soluble in water and acts as a weak acid, giving the hydrosulfide ion $HS^-$; recovery and/or separation of fly ash, carbon, and other elements of emissions from combustion processes or other reactions; etc.

Another example is enhanced/greater combustion of solid and liquid fuels in furnaces, vehicles, etc. One specific example is to directly, stably infused oxygen at low, moderate, high or ultra-high levels into a liquid fuel such as gasoline or diesel fuel before it is combusted, but such oxygen-infused fuels must be carefully combusted in order to avoid creating a runaway reaction. As another example, water stably infused with at low, moderate, high or ultra-high levels of oxygen may be combusted together with a solid or liquid fuel to achieve greater combustion rates/efficiency, while reducing emissions of non-combusted fuels.

According to a third exemplary embodiment of the present invention the gas stably infused in the liquid may be a very reactive gas which normally is not stable at all. For example, nascent oxygen, a single oxygen atom radical, is a known highly reactive oxidant and is typically formed in situ because it is so reactive and does not stay in nascent form for any length of time. According to an exemplary embodiment of the present invention, there is provided a process for forming a stabilized liquid solution containing nascent oxygen therein, comprising the steps of: treating a stream of oxygen ($O_2$) gas with an appropriate light source that excites and splits the oxygen ($O_2$) molecules into nascent oxygen; infusing the nascent oxygen into a liquid such as water within a high pressure treatment cell to form a liquid having a suitable concentration of infused nascent oxygen, e.g., as 5-700 ppm; then stabilizing the pressurized gas-infused liquid by passing it through a flowpath which compresses the nascent oxygen into stable nano bubbles. An appropriate light source for exciting and splitting the oxygen ($O_2$) molecules into nascent oxygen is an ultra violet (UV) white light source, e.g., one which outputs light beams with a wave length of approximately 331 nm (nanometers).

Given that the nascent oxygen gas is so reactive, it is important to form the various components of the system that are contacted by the nascent oxygen with at least a surface coating of material that will not react with or will resist reacting with the nascent oxygen. Some suitable materials include silica based glass ($SiO_2$), stainless steel, various ceramics, and Polytetrafluoroethylene (PTFE). Also, it is important that the oxygen ($O_2$) gas is split into the nascent oxygen prior to being infused into the liquid such as water because it is very difficult or impossible to split the oxygen ($O_2$) gas into the nascent oxygen after it is infused into the water/liquid in that the water/liquid tends to absorb the energy of the light source.

A flowpath used to stabilize the oxygen-infused liquid may be one such as those disclosed in any of U.S. Pat. Nos. 9,596,186, 9,527,046, and U.S. Utility application Ser. No. 15/591,422. The liquid may be water which is pure or substantially clear so that the UV light may readily pass through it to reach the oxygen molecules and split same. Once the stabilized liquid containing the infused nascent oxygen is formed, it may then be used for a wide variety of useful purposes, including chemical oxidation reactions because the nascent oxygen is a highly reactive oxidant, e.g., at least 100 times greater than the normal $O_2$ molecule in reactions in reactions of chemical elements that are chemically oxidizable. The ORP (oxygen reduction potential) of the stabilized, nascent oxygen infused water produced according to the present invention will exceed the scale for normal oxygen by approximately 1100. It is the present inventor's belief and understanding that no one has previously been able to create a stable solution containing an appreciable amount of nascent oxygen therein.

One suitable use for the stabilized nascent oxygen-infused water is for processing wood pulp so that it may be used in paper production. Currently hydrogen peroxide ($H_2O_2$) is used for breaking down the lignin of wood pulp and bleaching the wood pulp. Hydrogen peroxide is not as stable or as powerful of a chemical oxidant as stable the stabilized nascent oxygen-infused water according to the present invention, and correspondingly the stabilized nascent oxygen-infused water may be used to achieve more efficient and less costly processing of the wood pulp. Another potential use of the stabilized nascent oxygen-infused water is as a bleaching agent for wood pulp.

According to a fourth exemplary embodiment of the present invention the stabilized, gas-infused water containing high or ultra high concentrations of infused oxygen is used as a means for augmenting oxygen into an open body of water such as a pond, lake, or river, to revitalize same. Ponds, lakes, rivers, and other open bodies of water may become so-called dead zones because oxygen uptake from the water exceeds the replenishment of oxygen therein, thus leaving the water in an oxygen deficient state. In extreme oxygen deficient states, the open body of water may even come into a septic condition, which is very harmful for most living matter, but which promotes growth of some species of algae, bacteria, parasites, etc., as well as decomposition of organic matter into ammonia ($NH_3$) and/or other odorous or toxic materials, which is extremely bad for and may destroy a healthy eco system. To counteract the oxygen deficient state of an open body of water, appropriate amount(s) of water stably infused with a high or ultra-high amount(s) of oxygen is/are flowed into the open body of water over a period of time until the open body of water contains an average diluted amount of the stabilized, infused oxygen in a range of approximately 2-5 mg/l. Such diluted amount of the stabilized, infused oxygen is an appropriate level for revitalizing living matter in the open body of water, but is not so high as to form a plume that would chemically oxidize and create a fish kill or other undesirable state in the body of water, e.g., oxygen levels above 7 mg/l are considered harmful to fish. The stabilized, oxygen-infused water may be flowed into the open body of water at one or more locations, and at any appropriate flow rates, although it is preferred that when the oxygen-infused water flows into the open body of water, typically at standard temperature and pressure, it is done so as a laminar flow so as not to create any shear in the liquid, and that the outlet from which the oxygen-infused gas is discharged into the open body of water is configured such that that little or no cavitation is generated. Shear and cavitation are undesirable because they cause at least some of the infused gas to become unstable and released from the water. The discharge nozzle disclosed in U.S. patent application Ser. No. 15/591,422 is very suitable for such purpose. See U.S. Pat. No. 9,527,046 for further discussion on avoiding shear and cavitation.

Once an appropriate level of the stabilized, infused oxygen is achieved in the open body of water, further addition of the stabilized, oxygen-infused water may be discontinued until the open body of water again drops to a deficient oxygen level, and at which time further appropriate amount(s) of water stably infused with a high or ultra-high amount(s) of oxygen may be flowed into the open body of water over a period of time until the open body of water again contains an average diluted amount of the stabilized, infused oxygen in a range of approximately 2-5 mg/l. This process may be repeated several times, but at some point the open body of water should return to a revitalized state which is self-sustaining for at least some extended period of time.

According to the fourth exemplary embodiment of the present invention, oxygen and other gasses may be stably infused into water which may then be used for stimulating growth in animals and plants. For example, stabilized, oxygen-infused water containing low or moderate amounts of oxygen may be consumed directly or as mixed with other substances by humans, mammals, and other animals to stimulate desired biological reactions such as acceleration of metabolism. As another example carbon dioxide ($CO_2$) may be stably infused in water at low or moderate amounts and then provided to various plant life to stimulate growth such as in a hydroponic growing environment.

According to a fifth exemplary embodiment of the present invention the stabilized, gas-infused water containing high or ultra high concentrations of infused oxygen is used as a means for bio-remediation of biodegradable matters in a bio-reaction process. Bio-remediation of organic matters can, for example, be performed in an aerobic bio-reactor or treatment cell having a nutrient load or pounds of biochemical/biological oxygen demand (BOD). In a bio-reaction process according to the fifth exemplary embodiment of the present invention, an aqueous-based liquid containing the organic matters to be bio-remediated, e.g., waste water at a municipal waste water treatment plant, may be directly or indirectly infused with a gas (typically oxygen) which is essential or helpful to support microbial life forms and maximize an aerobic plate count (APC) until an optimal amount of the infused gas in the liquid is achieved using, for example, the systems and methods disclosed in the present inventor's prior patents and patent applications mentioned herein. The optimal amount of the gas to be infused will typically depend on the gas and the microbial species involved in the bio-remediation. For example, if oxygen the gas and organic matters include human waste, the optimal amount of infused oxygen is typically in a range of 2-7 mg/l.

If the process involves direct infusion of oxygen into the waste water, a small portion of the waster water may be directly infused with a high or ultra-high concentration of oxygen and then combined with a much larger portion of the waste water in the bio-reactor, e.g., an injection nozzle fixed to the bio-reactor injects the oxygen-infused water into the reactor containing the larger portion of the waste water until the average content of infused oxygen in the combined liquids is within the optimal range for the microbial species involved. Similarly, if the process involves indirect infusion of oxygen into the waste water, clean water may with oxygen at high or ultra-high levels according to the present inventor's previously disclosed systems and methods, and then the oxygen-infused water is combined with the waste water in the bio-reactor until the average content of infused oxygen in the combined liquids is within the optimal range for the microbial species involved.

Once the aerobic digestion process is active within the bio-reactor, the optimal concentration of infused oxygen may be maintained at a controlled ppm or mg/l by monitoring the oxygen level using a dissolved oxygen meter or other appropriate sensor, with parameters set based on the species of treatment. When the infused oxygen reaches a maximum concentration limit of the optimal range injection of the oxygen-infused water into the bio-reactor is discontinued, allowing the microbial oxygen uptake to consume the oxygen in the bio-remediation of organic matters until the oxygen content drops to a lower limit within the optimal range, at which point injection of the gas-infused water is again restarted and continued until the oxygen concentration of the combined liquids in the bio-reactor is increased back to the upper limit, and the cycle is repeated as necessary so the aerobic digestion process is maintained at the optimal dissolved oxygen content at all times.

Such treatment process according to the sixth aspect of the invention can very rapidly biodegrade organic nutrients in waste water. Typical BOD to oxygen ratio is 1-1.5 pounds of oxygen will consume 1 pound of BOD. To calculate pounds of BOD in waste water the formula is: (Vol−MGD)×(Conc−Mg/L)×8.34=Loading pounds. With this formula it is possible to pre-calculate pounds of oxygen needed to treat a volume of waste water at a specific Concentration of BOD. Additionally, with a respirometer or measurement of oxygen uptake an operator can determine any other elements, such as carbon, that are missing or at a deficient level, and if so may be added to further accelerate the bio-degradation process.

According to a seventh exemplary embodiment of the present invention the stabilized, gas-infused water containing infused oxygen may be used as a means for safely and efficiently treating contaminated sediment at the bottom of a body of water in situ without having to stir up or remove the sediment. Particularly, the present inventor has determined that stabilized, oxygen-infused water containing low to moderate amounts of infused oxygen will sink to the bottom of an open body of water if the oxygen-infused water is chilled to a temperature sufficiently below the surface temperature of the body of water prior to being added to the body of water. Also, if the body of water is reasonably deep, temperature of the water at the bottom it will be at a significantly lower temperature than the water at the surface, which will further assist in maintaining the stable, oxygen-infused water at the bottom of the body of water. Thus, for example, if the sediment at the bottom of a body of water is known to contain a significant quantity of a given contaminant such as phosphorous, a process for remediating the sediment in situ according to the sixth exemplary embodiment of the present invention may involve the steps of: generating a solution of oxygen-infused water containing an appropriate quantity of oxygen, e.g., 2-7 mg/l at high pressure in a hyperbaric chamber; stabilizing the pressurized oxygen-infused water by passing it through a flowpath which compresses the oxygen into nano bubbles; cooling the stabilized, oxygen-infused water; and flowing the cooled, stabilized, oxygen-infused water into a body of water at a laminar flow, and below the surface of the body of water such that the cooled, stabilized, oxygen-infused water sinks to the bottom of the body of water and remains there permitting the infused oxygen to react with contaminants in sediment at the bottom of the body of water.

Again, a suitable flowpath for stabilizing the oxygen-infused water may be one as previously proposed by the present inventor and disclosed in the patents and patent applications mentioned herein. As discussed in these prior applications, the oxygen as stably infused in the water may remain infused therein for one or two months, or longer. Further, by flowing the oxygen-infused water at laminar flow rate and at specific locations of the body of water, the oxygen will accumulate at the bottom of the body of water beneath these specific locations and generally remain at these locations until the oxygen is depleted. Hence, the infused oxygen has a relatively long time to react with the contaminants in the sediment.

According to an eighth exemplary embodiment of the present invention the stabilized, gas-infused water containing high or ultra high concentrations of infused oxygen is used as a means for efficiently separating components of liquid mixture or chemically engineered product. In a separation process according to the eighth aspect of the present invention, water or an aqueous based liquid may be stably infused with high or ultra-high amounts of an appropriate gas or gasses such as oxygen, carbon dioxide, etc. using, for example, the systems and methods previously proposed by the present inventor and disclosed in the patents and patent applications mentioned herein. The gas-infused may then be injected into a treatment cell along with the liquid mixture or chemically engineered product in a continuous process conducted in a treatment cell, e.g., the liquid mixture or chemically engineered product is injected into the treatment cell so that it is floated across the top of a layer of the stable gas-infused water or aqueous based liquid according to a system and process such as disclosed in U.S. Utility patent application Ser. No. 15/412,684, which allows micro bubbles of the infused gas to be released from the water or aqueous based liquid and permeate upwardly through the liquid mixture or chemically engineered product being treated causing components of the liquid mixture or chemically engineered product to be efficiently separated. This process displaces the density of the liquid mixture or chemically engineered product thus allowing separation of the components of same by molecular weight.

According to a specific process disclosed in U.S. Utility patent application Ser. No. 15/412,684 crude oil contaminated with rag oil, suspended solids, and perhaps other undesirable components is a liquid mixture which is efficiently separated into components according to the eighth aspect of the present invention, e.g., it is separated into sweet crude oil, rag oil, total suspended solids (TSS), and undesired gaseous components, which may be conveniently, separately discharged from the treatment cell.

An example of a chemically engineered product that may be separated in a process according to the eighth aspect of the present invention is a waste or off-spec polymeric emulsion such as a urethane emulsion. Again, a layer of this chemically engineered product may be floated across the top of a layer of the stable gas-infused water or aqueous based liquid according to a process such as disclosed in U.S. Utility patent application Ser. No. 15/412,684, which allows micro bubbles of the infused gas to be released from the water or aqueous based liquid and permeate upwardly through the chemically engineered product causing components of the liquid mixture or chemically engineered product to be efficiently separated, such that they may be reused or safely disposed of as non-reactive non-hazardous waste.

According to a ninth exemplary embodiment of the present invention the stabilized, a gas-infused liquid containing high or ultra high concentrations of infused gas may be used in combination with other known treatment systems and processes for enhancing the same. For example, electro-coagulation is a known process for treating aqueous based solutions for removing contaminants therefrom, and electro-coagulation can be greatly enhanced when used in combination with water or aqueous based solutions that have been stably infused with high or ultra-high concentrations of oxygen according to the present invention. For example, waste water may be initially, stably infused with an appropriate amount of oxygen, and then subjected to electro-coagulation for removing various impurities from the waste water. Electro coagulation increases the conductivity and ionization potential of the waster water by 4 fold at a given pH. Typically lower pH would have greater conductivity than that of higher pH, but the stable infusion of oxygen into the waster water prior to the electro-coagulation increases the ionization potential four fold to the comparative normal conductance, whereby the electro-coagulation can more efficiently remove the impurities faster and to a greater extent.

As another example, carbon dioxide ($CO_2$) and other gasses may be stably infused into a liquid containing contaminants that are reactive to anionic or cationic polymers. The stably infused $CO_2$, or other gasses, cause greater reaction in the electrocoagulation process in liberating contaminates that are reactive to anionic or cationic polymers. Typically the voltage remains the same or is lower and the current load increases in highly conductive solutions during the electrocoagulation process making the contaminates highly reactive to a polymerized flock of the anionic or cationic polymers e.g., the contaminates bond to the polymerized flock of the anionic or cationic polymers, drop out of solution and may then be easily removed.

As another example according to the ninth exemplary embodiment of the present invention, stabilized, gas-infused liquid may be combined with electro coagulation for desalinating salt water. Specifically, carbon dioxide ($CO_2$) may be stably infused into saltwater at high or ultra-high concentrations of carbon dioxide according to the present inventor's disclosed systems and methods in the prior patent and patent applications mentioned herein, whereby the carbon dioxide will react with sodium in the saltwater, and subsequently subjecting the carbon dioxide treated saltwater to electro coagulation will cause the salt (sodium chloride) to precipitate out of the water.

Persons skilled in the art will readily appreciate that the systems and methods of the present invention may be applied for treating all types of liquids and solutions to remove undesirable components thereof by tailoring the treatment operation to particular liquid or solution and the component(s) thereof which are sought to be removed.

The foregoing description is given for clearness of understanding only, and no unnecessary limitations should be understood therefrom, as modifications within the scope of the invention may be apparent to those having ordinary skill in the art and are encompassed by the claims appended hereto.

I claim:

1. A method for producing stabilized, gas-infused liquids containing ultra high concentrations of infused gas, comprising the steps of:
    a) generating a gas-infused liquid by injecting a pressurized liquid and a gas into a sealed vessel under a high pressure of at least 20 psi;
    b) stabilizing the infused gas in the liquid by discharging the gas-infused liquid from the sealed vessel, while still under the high pressure, into a tubular flow path arrangement which is configured to effect a multi-dense compaction of elements of the gas-infused liquid, and thereby form the infused gas into nano bubbles in the gas-infused liquid;
    c) infusing an additional amount of the gas into the stabilized, gas-infused liquid by injecting the stabilized, gas-infused liquid, while still under high pressure, back into the sealed pressure vessel along with more of the gas; and
    d) stabilizing the additional amount of gas into the stabilized, gas-infused liquid by again discharging the gas-infused liquid from the sealed vessel, while still under the high pressure, into the tubular flow path arrangement to thereby form the additional amount of infused gas into nanobubbles in the stabilized, gas-infused liquid.

2. The method according to claim 1, wherein the steps c) and d) are repeated at least one additional time to infuse and stabilized additional amount(s) of the gas into the stabilized, gas-infused liquid.

3. The method according to claim 2, wherein the gas is oxygen and the liquid includes water.

4. The method according to claim 1, wherein the gas is oxygen and the liquid includes water.

5. A method of oxidizing a compound by reacting the compound with the stabilized, gas-infused liquid of claim 1.

6. A method of oxidizing a compound by reacting the compound with the stabilized, gas-infused liquid of claim 3.

7. A method for forming a stabilized liquid solution containing nascent oxygen therein, comprising the steps of:
    treating a stream of oxygen ($O_2$) gas with a light source that excites and splits the oxygen ($O_2$) molecules into nascent oxygen;
    infusing the nascent oxygen into a liquid within a pressurized treatment cell at a pressure of at least 20 psi to form a liquid infused with the nascent oxygen; and
    stabilizing the pressurized gas-infused liquid by passing it through a flowpath which compresses the nascent oxygen into stable nano bubbles.

8. The method according to claim 7, wherein the light source is an ultra violet (UV) light source.

9. The method according to claim 8, wherein the UV light source outputs light beams with a wave length of approximately 331 nm (nanometers).

10. The method according to claim 7, wherein in the infusing step the nascent oxygen is infused into the liquid at 5-700 ppm.

11. A method of oxidizing a compound by reacting the compound with the stabilized, liquid solution containing nascent oxygen of claim 7.

* * * * *